United States Patent [19]

Steigerwald et al.

[11] 4,426,564
[45] Jan. 17, 1984

[54] PARALLEL RESONANT INDUCTION COOKING SURFACE UNIT

[75] Inventors: Robert L. Steigerwald, Scotia; William P. Kornrumpf; John P. Walden, both of Schenectady, all of N.Y.

[73] Assignee: General Electric Company, Schenectady, N.Y.

[21] Appl. No.: 323,610

[22] Filed: Nov. 20, 1981

Related U.S. Application Data

[63] Continuation of Ser. No. 107,259, Dec. 26, 1979, abandoned.

[51] Int. Cl.³ .................................................. H05B 6/06
[52] U.S. Cl. ............................. 219/10.77; 219/10.49 R; 363/80; 363/97; 363/132; 323/262; 307/250
[58] Field of Search ................. 219/10.77, 10.49 R, 219/10.75; 363/17, 80, 39, 40, 131, 132, 135, 136, 96, 97, 98; 307/250, 252 M, 252 Q; 323/8, 24, 102, 105, 124, 128, 225, 259, 290, 262, 263, 232

[56] References Cited

U.S. PATENT DOCUMENTS

| | | | |
|---|---|---|---|
| 2,416,172 | 2/1947 | Gregory et al. | 219/10.77 |
| 3,466,528 | 9/1969 | Adams | 219/10.75 X |
| 3,989,916 | 11/1976 | Amagami et al. | 219/10.77 X |
| 4,085,300 | 4/1978 | MacKenzie et al. | 219/10.49 R |
| 4,112,287 | 9/1978 | Oates et al. | 219/10.49 R |
| 4,115,676 | 9/1978 | Higuchi et al. | 219/10.49 R |

FOREIGN PATENT DOCUMENTS

| | | | |
|---|---|---|---|
| 568142 | 9/1977 | U.S.S.R. | 219/10.77 |
| 574836 | 9/1977 | U.S.S.R. | 219/10.77 |

*Primary Examiner*—B. A. Reynolds
*Assistant Examiner*—Philip H. Leung
*Attorney, Agent, or Firm*—William H. Steinberg; James C. Davis, Jr.; Marvin Snyder

[57] ABSTRACT

A parallel resonant induction cooking surface unit comprises a voltage fed inverter which drives a load circuit, comprised of a main induction drive coil, a tuning capacitor coupled in parallel with the main induction drive coil, and an inductor coupled in series with the main induction drive coil, with a square wave voltage, causing the main induction drive coil to generate a time variant magnetic field resulting in eddy currents being induced in the surface of a metallic, food-containing utensil positioned adjacent to the main induction drive coil, and hence, utensil heating. By tuning the load circuit to resonance at or near the square wave frequency, reactive currents therein are minimized, resulting in improved power factor. Moreover, resultant main induction drive coil voltage and current are nearly sinusoidal, thereby achieving reduced electromagnetic interference radiation at frequencies greater than the square wave frequency.

20 Claims, 13 Drawing Figures

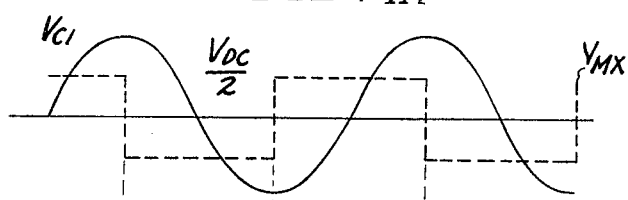
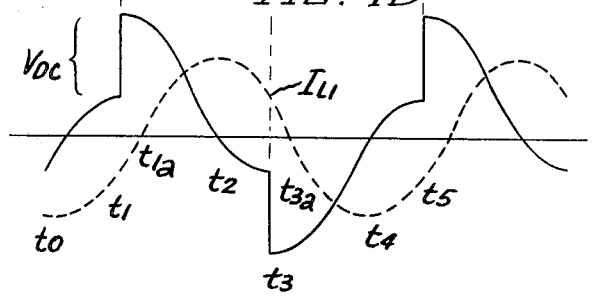
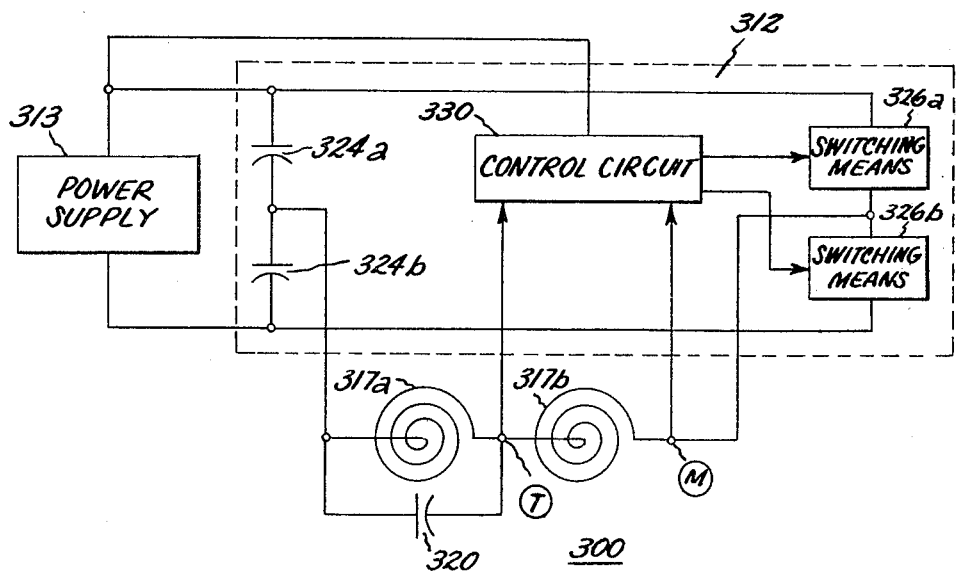
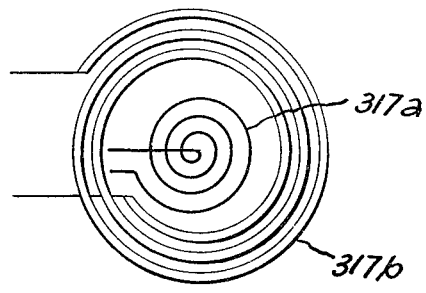
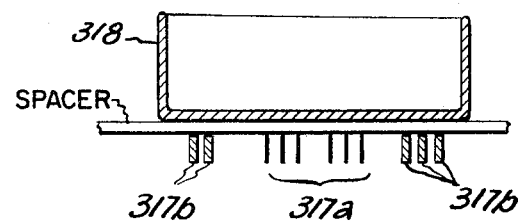

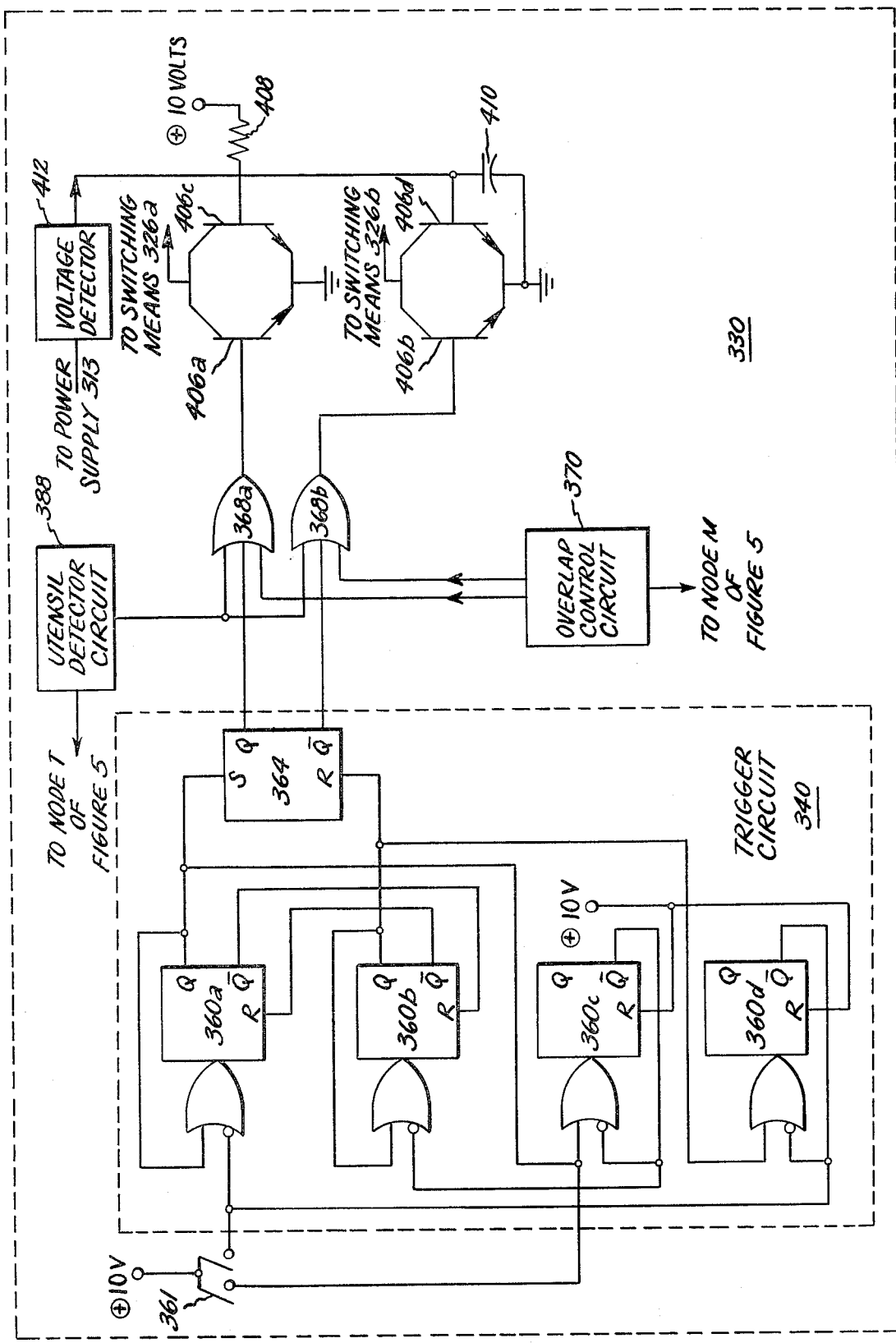

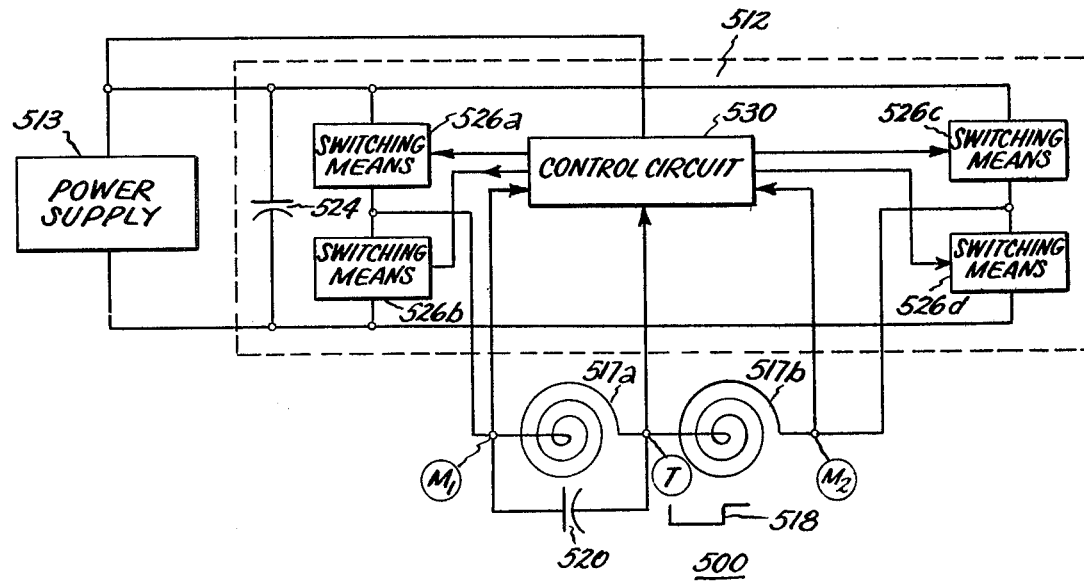
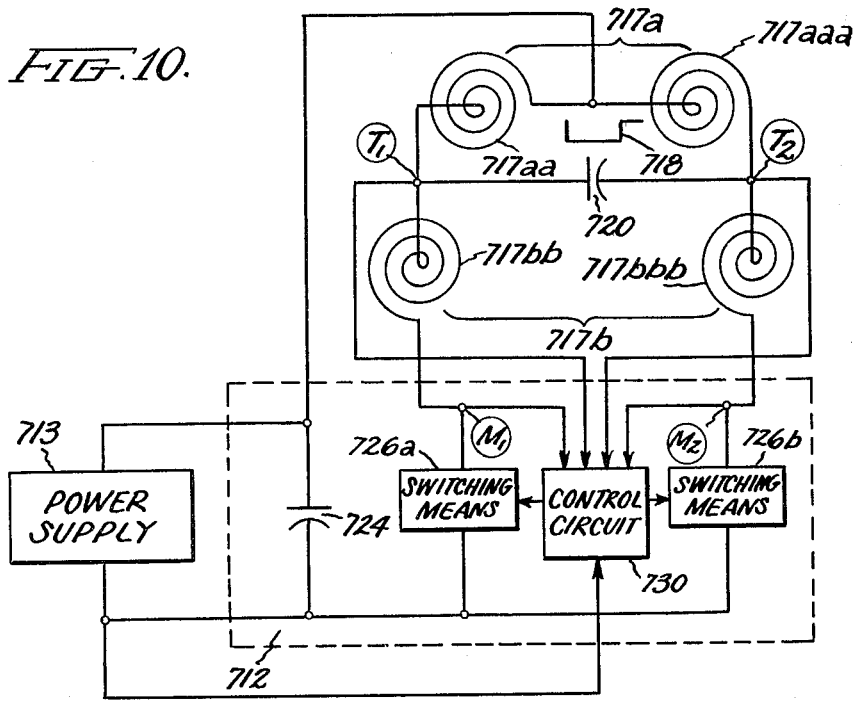

PARALLEL RESONANT INDUCTION COOKING SURFACE UNIT

This application is a continuation, of application serial no. 107,259, filed 12-26-79 now abandoned.

BACKGROUND OF THE INVENTION

This invention relates generally to induction cooking, and more specifically, to an induction cooking surface unit having high efficiency and reduced electrical stresses on the surface unit switching components.

The principle of induction cooking, that is, circulating eddy currents in the surface of a metallic, food-containing utensil with a time-variant magnetic field generated by an induction drive coil positioned adjacent to the utensil, to cause joule losses in the utensil, and hence, utensil heating, is not a recent innovation. Rather, the principle of induction cooking is well known.

Advantageously, induction cooking is more efficient and less hazardous than conventional cooking with gas burners or electric surface units. When a metallic utensil is heated inductively, virtually all the heat is concentrated in the utensil itself and not on the utensil surface as is the case with conventional utensil heating by gas burners or electric surface units. Because the induction surface unit becomes only slightly warm to the touch during operation, the liklihood of injury to a user, should the induction surface unit be contacted during operation, is greatly reduced.

One of the difficulties in implementing induction cooking on a widespread basis has been the low power factor associated with the induction drive coil. This is primarily attributable to the relatively poor coupling between the induction drive coil and the metallic food-containing utensil. Unless the bottom utensil surface is flat, unbroken, and in intimate contact with the induction drive coil, induction drive coil-utensil coupling cannot readily be improved. Therefore, the present invention is concerned with an improved induction surface unit exhibiting high power factor at full output power and reduced radiation of electromagnetic interference, notwithstanding poor induction drive coil-utensil coupling.

BRIEF SUMMARY OF THE INVENTION

Briefly, in accordance with a preferred embodiment of the invention, a parallel resonant induction cooking surface unit for inductively heating a metallic utensil positioned adjacent thereto comprises a voltage fed inverter which supplies a square wave voltage to a load circuit, comprised of a main induction drive coil, a tuning capacitance coupled in parallel with the main induction drive coil, and an inductor, configured of either a second induction drive coil or a linear reactor, and coupled in series with the main induction drive coil. Exciting the inverter load circuit with a square wave voltage causes the main induction drive coil (and the second induction drive coil if the inductor is so configured) to generate a time-variant magnetic field for circulating eddy currents in the utensil surface to cause joule losses which result in utensil heating. By selecting the tuning capacitor value so that the inverter load circuit resonates at a frequency at, or near the inverter output frequency, inverter load circuit reactive currents are minimized resulting in improved power factor. Moreover, with the tuning capacitance so selected, main induction drive coil current and voltage are nearly sinusoidal resulting in reduced radiation of electromagnetic interference at frequencies higher than the inverter output frequency.

It is an object of the present invention to provide an induction cooking surface unit in which reactive currents are minimized, thereby improving power factor and reducing inverter component stresses;

It is another object of the present invention to provide an induction cooking surface unit in which the induction drive coil is energized with a nearly sinusoidal current and voltage thereby reducing radiated electromagnetic interference at frequencies higher than the induction surface unit operating frequency.

BRIEF SUMMARY OF THE DRAWINGS

The features of the invention believed to be novel are set forth with particularity in the appended claims. The invention itself, however, together with further objects and advantages thereof, may best be understood by reference to the following description taken in conjunction with the accompanying drawings in which:

FIG. 4a is a graphical illustration of the waveforms of inverter load circuit voltage and tuning capacitance voltage produced during operation of the induction cooking surface unit of FIG. 1;

FIG. 4b is a graphical illustration of the waveforms of linear reactor current and linear reactor voltage produced during operation of the induction cooking surface unit of FIG. 1;

FIG. 5 is a schematic diagram of a dual induction drive coil parallel resonant induction cooking surface unit according to the present invention;

FIG. 6a is a simplified top view of the main and the second induction drive coils comprising a portion of the induction cooking surface unit of FIG. 5;

FIG. 6b is a simplified cut-away side view of the main and the second induction drive coils of FIG. 6a showing a metallic utensil positioned adjacent thereto;

FIG. 7 is a block diagram of the control apparatus of the induction cooking surface unit of FIG. 5;

FIG. 8 is a schematic diagram of a full bridge induction cooking surface unit according to the present invention;

FIG. 10 is a schematic diagram of a push-pull induction cooking surface unit according to the present invention.

DETAILED DESCRIPTION OF THE PREFERRED EMBODIMENTS

Figure 1:
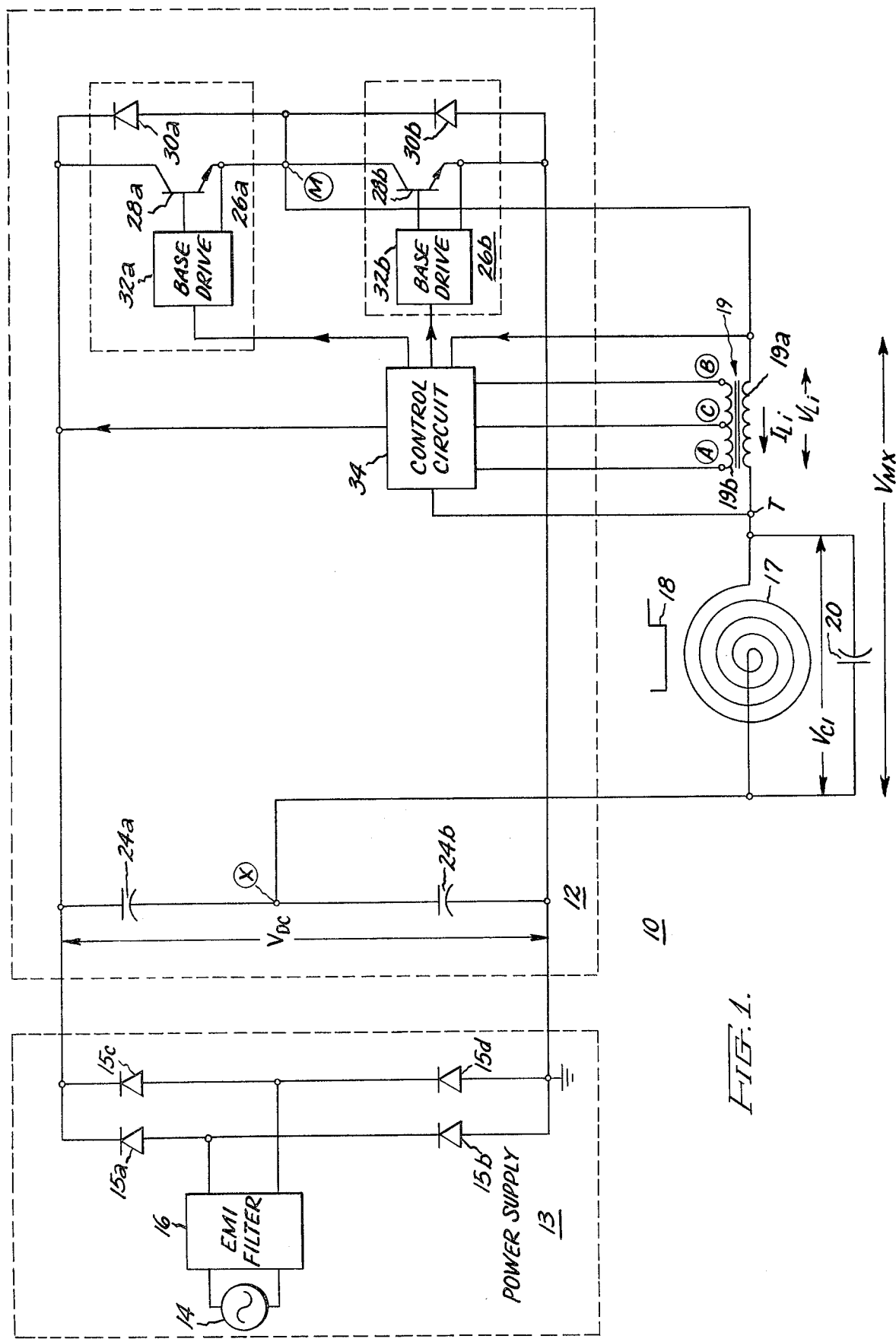
FIG. 1 is a schematic diagram of a preferred embodiment of an induction cooking surface unit according to the present invention.

FIG. 1 illustrates a preferred embodiment 10 of a parallel resonant induction cooking surface unit according to the present invention. Induction cooking surface unit 10 comprises a voltage fed inverter 12, which, when supplied with current from a power supply 13, produces a square wave output voltage. Typically, power supply 13 comprises an alternating current source 14 which is usually a 110-120 or 220-240 volt alternating current supply. Two pairs of rectifiers 15a and 15b and 15c and 15d, with the rectifiers of each pair coupled in series aiding fashion, are each coupled across the output of an electromagnetic interference filter 16, the input of electromagnetic interference filter 16 being coupled to alternating current source 14.

Inverter 12 is coupled at the output to supply a square wave voltage to a load circuit comprised of an induction drive coil 17, configured to support metallic food containing utensil 18 positioned adjacent thereto, an inductor 19 coupled in series with induction drive coil 17, with the junction between induction drive coil 17 and inductor 19 designated as node T, and, a tuning capacitance 20 coupled in parallel with induction drive coil 17. The value of tuning capacitance 20 is preferably selected so as to tune the inverter load circuit, configured as described above, to a preset resonant frequency, which is typically equal to, or near the output frequency of inverter 12.

Inductor 19 is configured of a linear reactor having a primary winding 19a serially coupled with induction drive coil 17 across the inverter output, and a secondary winding 19b which is center-tapped, the terminals of secondary winding 19b being designated A, C and B, respectively, with terminal C designating the secondary winding center tap. Inverter 12 comprises a pair of serially-coupled filter capacitances 24a and 24b which are coupled across power supply 13. The junction between filter capacitances 24a and 24b, designated node X, is coupled to induction drive coil 17. A pair of serially-coupled switching means 26a and 26b are coupled across filter capacitances 24a and 24b with the junction between switching means, designated node M, coupled to linear reactor primary winding 19a. Switching means 26a includes a transistor 28a, the collector-emitter portion of which is coupled between power supply 13 and node M. A diode 30a is coupled in parallel opposition with the transistor collector-emitter portion to provide a path for reverse transistor collector-emitter current to flow. A transistor base drive circuit 32a, the details of which are set forth hereinbelow, is coupled to the base and emitter of transistor 28a and supplies transistor 28a with forward and reverse base drive current in accordance with one of a pair of control voltages supplied by a control circuit 34, the details of which are set forth herein below.

Switching means 26b is configured identically identically to switching means 26a and therefore includes a transistor 28b, the collector-emitter portion of which is coupled between unidirectional current source 13 and node M. An oppositely poled diode 30b is coupled across the collector-emitter portion of transistor 28b. A base drive circuit 32b is coupled to the base and the emitter of transistor 28b and supplies the transistor with forward and reverse base drive current in accordance with the other of the pair of control voltages provided by control circuit 34. During inverter operation, transistors 28a and 28b are alternately rendered conductive in accordance with the pair of control circuit output voltages, at a frequency of approximately 25 KHz.

Figure 2:
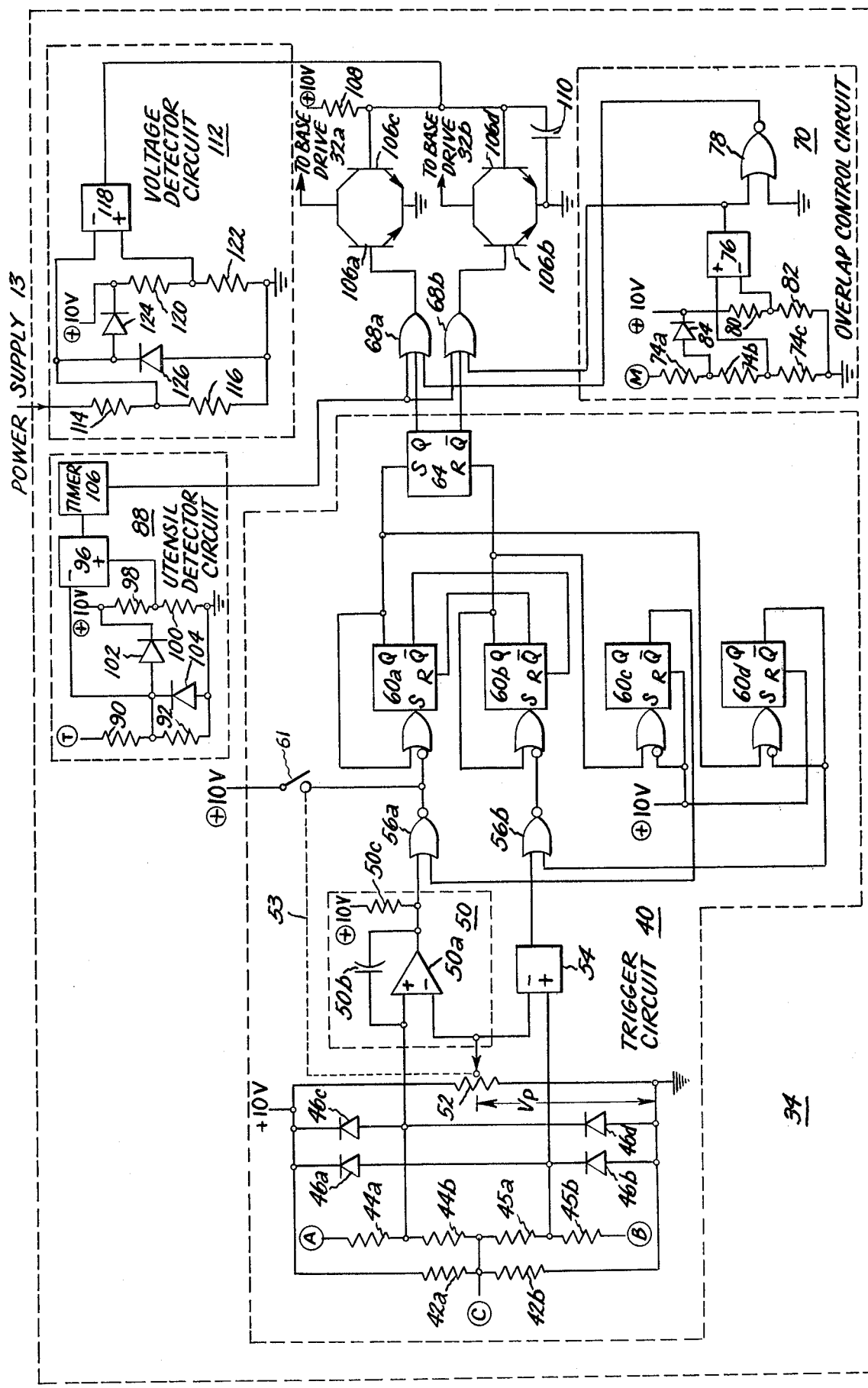
FIG. 2 is a block diagram of the control circuit comprising a portion of the induction cooking surface unit of FIG. 1.

The details of control circuit 34 are shown in FIG. 2. Control circuit 34 includes a trigger circuit 40 which, in accordance with voltages $V_{AC}$ and $V_{BC}$ as measured between terminals A and C and B and C, respectively, of linear reactor secondary winding 19b of FIG. 1, supplies a pair of output voltages which alternately deviate from a logical "zero" to a logical "one" level. Trigger circuit 40 includes a first serially-coupled pair of resistances 42a and 42b, which are coupled between the positive terminal of a 10 volt DC supply and circuit ground with the junction between resistances 42a and 42b coupled to linear reactor secondary winding terminal C. A second and third pair of serially-coupled resistances 44a and 44b, and 45a and 45b, respectively, are each coupled between linear reactor secondary winding terminals A and C and linear reactor secondary winding terminals B and C, respectively. A first serially-coupled pair of diodes 46a and 46b and a second serially-coupled pair of diodes 46c and 46d are each coupled between the positive 10 volt DC supply terminal and circuit ground. The junction between diodes 46a and 46b and the junction between diodes 46c and 46d, respectively, are connected to the junction between resistances 45a and 45b and to the junction between resistances 44a and 44b, respectively. Coupled in this manner, diode pairs 46a and 46b, and 46c and 46d, form a full wave rectifier bridge which rectifies the AC voltage present across linear reactor secondary winding 19b of FIG. 1 for superimposition on the DC voltage supplied by the 10 volt DC supply to protect control circuit 34 against excessive voltage transients by conducting excessive voltages to the 10 volt DC supply.

A first comparator 50 comprises a differential amplifier 50a having invert and noninvert inputs and an output, the output being coupled to the noninvert input by a capacitance 50b. A resistance 50c couples the differential amplifier output to the positive terminal of the 10 volt DC supply. Comparator 50 is coupled at the noninvert comparator input, being the noninvert input of differential amplifier 50a, to the junction between resistances 44a and 44b. The invert comparator input, being the invert input of differential amplifier 50a, is coupled to the wiper arm of a potentiometer 52, the fixed resistance portion of which is coupled in parallel with diodes 46c and 46d. Comparator 50, provides at its output a voltage which changes from a logical "zero" to a logical "one" level in accordance with the difference in magnitude between voltages supplied to the noninvert and invert comparator inputs. Thus, comparator 50 provides a voltage at its output in accordance with the difference in magnitude between the linear reactor secondary winding voltage $V_{AC}$, and a DC voltage $V_P$ across potentiometer 52, which is adjustable in accordance with movement of the potentiometer wiper arm.

A second comparator 54, configured identically to comparator 50, is coupled at its invert comparator input to the wiper arm of potentiometer 52. The noninvert input of comparator 54 is coupled to the junction between resistances 45a and 45b. Comparator 54 provides at its output a voltage which changes from a logical "zero" to a logical "one" level in accordance with the difference in magnitude between the linear reactor secondary winding voltage $V_{BC}$ and voltage $V_P$.

A pair of two input NOR gates 56a and 56b are each coupled at their first inputs to the outputs of comparators 50 and 54, respectively. The output of each of NOR gates 56a and 56b, respectively, is coupled to the invert set input of each of monostable multivibrators 60a and 60b, respectively, which together comprise a model 4538 dual monostable multivibrator such as manufactured by Fairchild Camera & Instrument Corporation. The invert set input of multivibrator 60a is also coupled to the positive 10 volt DC supply terminal by a momentary single pole single throw switch 61 which is typically mechanically linked to potentiometer 52 through a mechanism 53. The Q output of each of multivibrators 60a and 60b is connected to the noninvert set input of each multivibrator. In this manner, each multivibrator "latches", that is, each multivibrator becomes triggered and remains triggered without regard to extraneous voltages appearing at the multivibrator invert set or noninvert set inputs when, with the voltage at the noninvert multivibrator input at a logical "one" level, the voltage at the multivibrator invert set input changes from a logical "zero" level to a logical "one" level, or when, with the voltage at the multivibrator invert set input at a logical "zero" level, the voltage at the noninvert set input changes from a logical "one" level to a logical "zero" level. The reset input of multivibrator 60a is connected to the $\overline{Q}$ output of multivibrator 60b and likewise, the reset input of multivibrator 60b is connected to the $\overline{Q}$ output of multivibrator 60a. This allows multivibrator 60a when triggered, to inhibit multivibrator 60b from triggering and vice versa.

Each of a second pair of multivibrators 60c and 60d, is configured identically to multivibrator 60a and each is coupled, respectively, at its multivibrator noninvert set input to the Q output of each of multivibrator 60a and 60b, respectively. Multivibrators 60b and 60c are each adapted to trigger at a predetermined time interval after the voltage at the Q output of each of multivibrators 60a and 60b, respectively, reaches a logical "one" level. Each of multivibrators 60c and 60d, respectively, is coupled at its Q output and its invert set input to the remaining input of each of NOR gates 56a and 56b, respectively, and thus, when each of multivibrators 60c and 60d, respectively, triggers, the voltage at the output of each of NOR gates 56a and 56b, respectively, changes from a logical "zero" to a logical "one" level, causing each of multivibrators 60a and 60b, respectively, to trigger. The reset input of each of multivibrators 60c and 60d is coupled to the positive 10 volt DC supply terminal to prevent each of multivibrators 60c and 60d from being triggered by extraneous noise.

An RS flip-flop 64 is coupled at each of the set and reset inputs, designated S and R, respectively, to the Q output of each of multivibrators 60a and 60b, respectively. The Q and $\overline{Q}$ outputs of flip-flop 64 are each coupled to the first input of each of a pair of three-input OR gates 68a and 68b, respectively. The second input of each of OR gates 68a and 68b, respectively, is supplied with the first output voltage and second output voltage, respectively, provided by an overlay control circuit 70 in accordance with the voltage between node M of FIG. 1 and circuit ground.

Overlap control circuit 70 comprises three resistances 74a, 74b and 74c, respectively, which are serially coupled between node M of induction surface unit 10 shown in FIG. 1 and circuit ground. The junction between resistances 74b and 74c is coupled to the noninvert input of a comparator 76 which is configured identically to comparator 50. The invert input to comparator 76 is coupled to the junction of resistances 80 and 82 which are serially coupled between the positive 10 volt DC supply terminal and circuit ground. A diode 84 is coupled at its anode to the junction between resistances 74a and 74b and at its cathode to the positive 10 volt DC supply terminal, and clamps the voltage appearing across resistance 74c to protect comparator 76.

Comparator 76 provides an output voltage which changes from a logical "zero" to a logical "one" level in accordance with the difference in magnitude between voltages supplied to the invert and noninvert comparator inputs. Thus, the comparator output voltage is indicative of the conductivity of transistor 28a of FIG. 1. The output voltage provided by comparator 76 is supplied to the second input of OR gate 68a as previously mentioned, and to the first input of a two input NOR gate 78, the remaining input which is coupled to circuit ground. NOR gate 78 provides an output voltage which is the logical complement of the output voltage of comparator 76, and thus is representative of the conductivity of transistor 28b, to the second input of OR gate 68b, as previously mentioned.

A utensil detector circuit 88 for detecting the presence of excessive voltage on induction drive coil 17 of FIG. 1, which excessive voltage may be present across the induction drive coil during induction cooking surface unit operation when metallic utensil 18 is displaced from the induction drive coil, and for supplying an output voltage to the third input of each of OR gates 68a and 68b to control the conduction of transistors 28a and 28b of FIG. 1 accordingly, is coupled at the utensil detector circuit input to node T of FIG. 1. Utensil detector circuit 88 comprises two resistances 90 and 92, respectively, which are serially coupled between node T of induction surface cooking unit 10 of FIG. 1 and circuit ground. The junction between resistances 90 and 92 is coupled to the invert input of a comparator 96 which is configured identically to comparator 50. Comparator 96 is coupled at the noninvert input to the junction of resistances 98 and 100 which are serially coupled between the positive 10 volt DC supply terminal and circuit ground. A first diode 102 is coupled at its anode to the junction of resistances 90 and 92 and at its cathode to the positive 10 volt DC supply terminal for clamping the AC voltage present across resistance 90. A second diode 104 is coupled in parallel with resistance 92. The output of comparator 96 is coupled to the input of a timer 106 typically configured of a model 555 timer such as is manufactured by Signetics Corp. Timer 106 produces the output signal of detector circuit 88 and hence is coupled at its output to the third input of each of OR gates 68a and 68b, as previously mentioned. When the voltage at the input to timer 106 changes from a logical "one" level to a logical "zero" level as a result of the voltage magnitude across resistance 98 dropping below the voltage magnitude across resistance 90, timer 106 becomes operative, causing the voltage at the timer output to alternate between a logical "zero" level to a logical "one" level which serves to periodically inhibit the conduction of each of transistors 28a and 28b of FIG. 1, thereby limiting induction drive coil voltage.

Each of OR gates 68a and 68b is coupled at its output to the base of a respective one of NPN transistors 106a and 106b. The emitter of each of transistors 106a and 106b is coupled to circuit ground. Transistors 106a and 106b are each coupled at their respective collector to a respective one of base drive circuits 32a and 32b, of FIG. 1. A separate transistor 106c and 106d, respectively, is coupled with its collector-emitter portion in parallel with the collector emitter portion of transistors 106a and 106b, respectively. Transistors 106c and 106d are each supplied at the base with a bias voltage from the 10 volt DC supply through a resistance 108. A capacitor 110 couples the base of transistors 106c and 106d to circuit ground.

A voltage detector circuit 112 is coupled at its output to the base of each of transistors 106c and 106d and supplies each of transistors 106c and 106d with forward base drive current to render them conductive when the output voltage of power supply 13 of FIG. 1 decreases in magnitude below a preset voltage, thus preventing low voltage from erroneously causing transistors 28a and 28b of FIG. 1 to conduct. Voltage detector circuit 112 comprises two resistances 114 and 116, respectively, which are serially coupled between power supply 13 of FIG. 1 and circuit ground. The junction between resistances 114 and 116 is coupled to the invert input of a comparator 118 which is configured identically to comparator 50. The noninvert input of comparator 18 is coupled to the junction between resistances 120 and 122 which are serially coupled between the positive 10 volt DC supply terminal and circuit ground. A first diode 124 is coupled at its cathode to the positive 10 volt DC supply terminal and at its anode to the invert comparator input. A second diode 126 couples the comparator 118 invert input to circuit ground. When the voltage supplied by unidirectional current source 13 of FIG. 1 decreases in magnitude below the voltage across resistance 120, the comparator 118 supplies a voltage at a logical "one" level to the base of each of transistors 106c and 106d to render the transistors conductive causing base drive circuits 32a and 32b of FIG. 1 to become operative to prevent conduction of transistors 28a and 28b, respectively, of induction surface unit 10 of FIG. 1.

Figure 3:
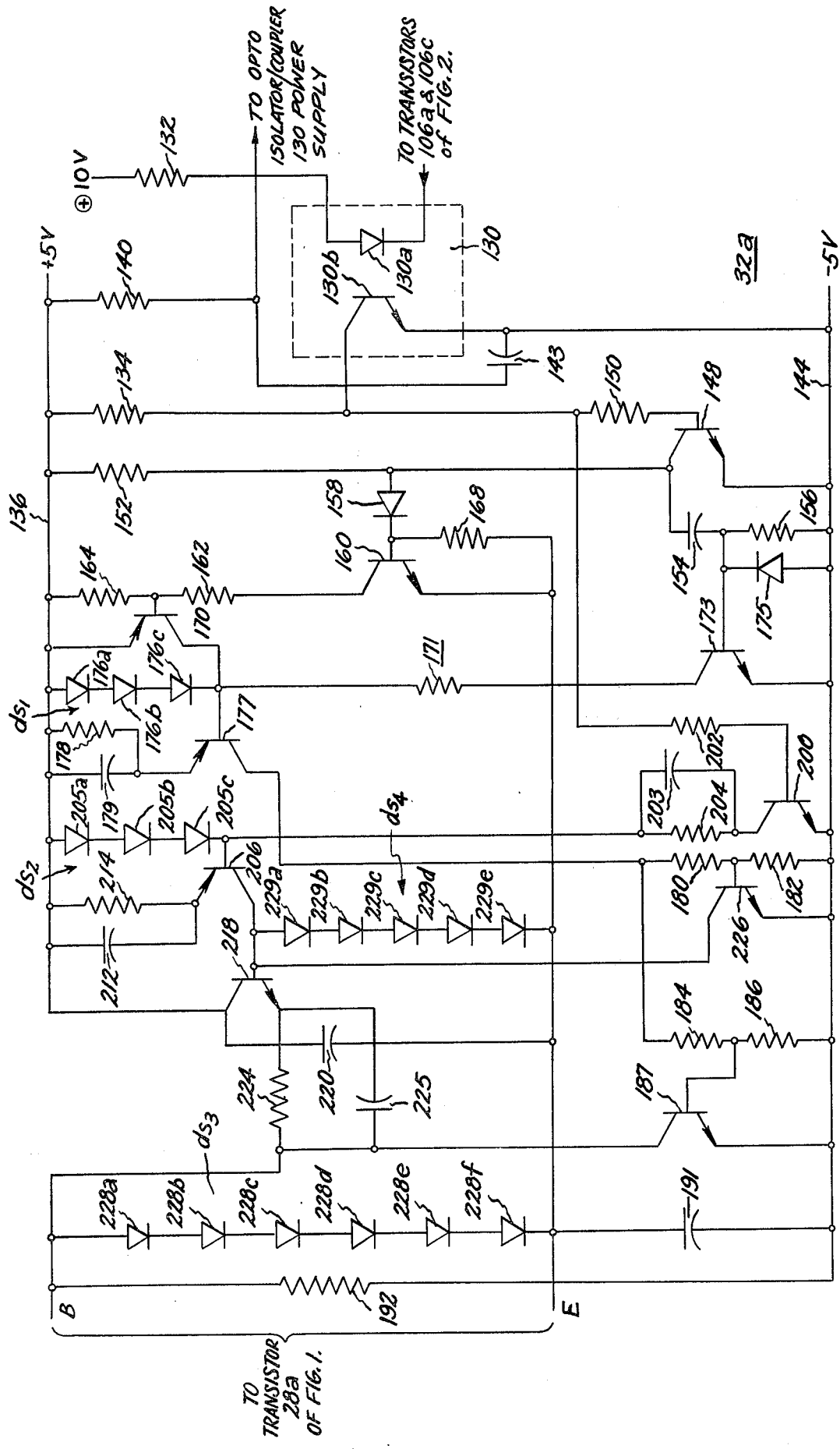
FIG. 3 is a schematic diagram of one of the pair of identically configured base drive circuits comprising a portion of the induction cooking surface unit of FIG. 1.

FIG. 3 is a schematic diagram of a base drive circuit 32a of FIG. 1, base drive circuit 32a being configured of identical components and operating in the same manner of base drive circuit 32b of FIG. 1. Base drive circuit 32a includes an optoisolator/coupler 130 which includes a light emitting diode 130a positioned in registration with a phototransistor 130b. Light emitting diode 130a is coupled in series with resistance 132 between a 10 volt DC source and the collector of each of transistors 106a and 106c of FIG. 2. Thus, when either of transistors 106a and 106c is conductive, diode 130a of FIG. 3 is energized, rendering phototransistor 130b conductive. Phototransistor 130b is coupled at the collector through resistance 134 to bus 136, which bus is supplied with a positive 5 volt DC voltage. Bus 136 is coupled by the serial combination of a decoupling resistance 140 and a bypass capacitance 143 to a bus 144, which bus is supplied with a -5 volt DC potential. The junction between capacitance 143 and resistance 140 is coupled to the optoisolator/ coupler power supply (not shown). Capacitance 143 is also coupled to the emitter of phototransistor 130b and suppresses any transients present which might otherwise be supplied to the optoisolator/coupler.

A transistor 148 is coupled at the base through a resistance 150 to the collector of phototransistor 130b. The collector of transistor 148 is coupled to the junction between resistance 152 and capacitance 154 which are connected in series with resistance 156 between busses 136 and 144. Coupled in this manner, transistor 148 is rendered nonconductive when phototransistor 130b becomes conductive.

A diode 158 couples the junction of resistance 152 and capacitance 154 to the base of a transistor 160, whose emitter is coupled through the serial combination of resistances 162 and 164 to bus 136. The emitter of transistor 160 is coupled to the emitter of transistor 28a of FIG. 1. Resistance 168 shunts the base emitter-junction of transistor 160 so that when transistor 148 becomes conductive, there will be insufficient voltage across the base emitter junction of transistor 160 to render it conductive.

A transistor 170 is coupled with the base emitter junction in parallel with resistance 164. The collector of transistor 170 is coupled through resistance 171 to the collector of transistor 173 whose base is coupled to the junction between capacitance 154 and resistance 156 and whose emitter is coupled to the junction of bus 144 and the anode of a diode 175. Diode 175 is coupled at the cathode to the base of transistor 173 and clamps the negative voltage across the transistor emitter-base junction.

A diode string $ds_1$, comprised of diodes 176a, 176b and 176c is coupled between bus 136 and the junction of collector of transistor 170 and the base of a transistor 177 whose emitter is coupled through the parallel combination of resistance 178 and capacitance 179 to bus 136. Transistors 177, 148, 160, 170, and 173, together with associated coupling components, form a one shot or monostable multivibrator circuit, which, when triggered by the interruption of current passing through light emitting diode 130a, produces a current limited signal at the collector of transistor 177.

The collector of transistor 177 is coupled to bus 144 through the serial combination of resistances 180 and 182, which resistances are shunted by the serial combination of resistances 184 and 186. A high current transistor 187 is coupled with the collector-emitter portion between the base of transistor 28 of FIG. 1 and bus 144. The base of transistor 187 is coupled to the junction of resistances 184 and 186. When supplied from transistor 177 with forward base drive current, transistor 187 becomes conductive, and draws as much current from the base of transistor 28a of FIG. 1 as is necessary to rapidly render the transistor nonconductive. This source of reverse base drive current is made low impedance as a consequence of capacitance 191 coupled between the emitter of transistor 28a of FIG. 1 and bus 144. A resistance 192, coupled between the base of transistor 28a and bus 144, maintains a negative bias on transistor 28a to hold it nonconductive once transistor 187 becomes nonconductive.

A transistor 200 is coupled at the base through a resistance 202 to the junction between resistances 150 and 134. The collector-emitter portion of transistor 200 is coupled in series with bus 144 and the parallel combination of capacitance 203 and resistance 204. A diode string $ds_2$, comprised of three serially-coupled diodes 205a, 205b and 205c couples bus 136 to capacitance 203 and resistance 204. The junction between diode string $ds_2$ and the parallel combination of capacitance 203 and resistance 204 is connected to the base of transistor 206 whose emitter is coupled through the parallel combination of capacitance 212 and resistance 214 to bus 136. Transistor 206 is coupled at the collector to the base of a transistor 218 whose collector is coupled to bus 136 and to the emitter of transistor 28a of FIG. 1 through a capacitance 220. The emitter of transistor 218 is coupled through resistance 224 to the base of transistor 28a of FIG. 1. When the current supplied to light emitting diode 130a is interrupted, transistor 200 becomes conductive to turn on transistor 218. When transistor 218 is turned on, current is supplied to transistor 28a of FIG. 1, thus rendering the transistor conductive. To assure rapid turn-on of transistor 218, a capacitance 225 is coupled in parallel with resistance 224. A transistor 226, coupled at the base to the junction of resistances 180 and 182, and coupled with the collector-emitter portion between the base of transistor 218 and bus 144, becomes conductive once current is resupplied to light emitting dioode 130a and diverts current away from transistor 218 to rapidly render it nonconductive. To prevent excessive currents in the base drive circuit should the emitter of transistor 28a fuse open, a diode string ds₃, comprised of six serially connected diodes 228a–228f, is coupled between the base and emitter of transistor 28a of FIG. 1. If the emitter of transistor 28a does fuse open, then current passes through diode string ds₃ without placing a high reverse voltage on transistor 218. An additional diode string ds₄ comprised of five serially connected diodes 229a–229e are coupled between the collector of transistor 206 and the emitter of transistor 28a to protect the base drive circuit should diode string ds₃ fuse open.

Operation of induction surface unit 10 is commenced by momentarily closing switch 61 of FIG. 2 causing a 10 volt DC potential to appear at the invert set input of multivibrator 60a. The presence of a 10 volt DC potential at the multivibrator invert set input inhibits multivibrator 60a from triggering. With multivibrators 60a and 60b dormant, a logical "zero" level voltage is present at both the set and reset inputs of RS flip-flop 64. Assuming flip-flop 64 to be in the initial or $Q_o$ state, and assuming the absence of voltage across induction drive coil 17 of FIG. 1, then a logical "zero" level and a logical "one" level voltage is present at the output of OR gates 68a and 68b, respectively, of FIG. 2, causing transistor 106a of FIG. 2 to remain nonconductive and transistor 106b of FIG. 2 to become conductive, respectively. Conductivity of transistors 106c and 106d is controlled by voltage detector circuit 112 of FIG. 2 in accordance with the magnitude of voltage supplied by power supply 13 shown in FIG. 1. Assuming that the output voltage magnitude of power supply 13 exceeds a preset value, then both of transistors 106c and 106d remain nonconductive. With transistors 106a and 106c both nonconductive, light emitting diode 130a of base drive circuit 32a of FIG. 3 remains de-energized.

With light emmitting diode 130 de-energized, base drive circuit 32a, transistors 200, 206 and 218 become conductive and supply forward base drive current to transistor 28a of FIG. 1 to render it conductive. Once transistor 28a becomes conductive, a ppositive voltage $V_{MX}$ as measured at node M with respect to node X, appears across the inverter load circuit, with the magnitude of $V_{MX}$ being one-half the magnitude of $V_{DC}$, the voltage across the serial combination of capacitances 24a and 24b of FIG. 1. With voltage $V_{MX}$ across the inverter load circuit, a current $I_{Li}$ is present in the primary winding 19a of linear reactor 19. Both the linear reactor primary winding voltage $V_{Li}$ and the tuning capacitance voltage $V_{Cl}$ increase, once transistor 28a of FIG. 1 is rendered conductive, until the linear reactor secondary winding 19b voltage $V_{AB}$ exceeds voltage $V_P$ at the invert input to comparator 50 of FIG. 2. When, at a time t₁, voltage $V_{AB}$ exceeds voltage $V_P$, the output voltage of comparator 50 of FIG. 2 goes to a logical "one" level which causes multivibrator 60a to trigger. Triggering of multivibrator 60a causes a logical "one" level voltage to appear at the set input of RS flip-flop 64 and simultaneously causes a logical "zero" level voltage to appear at the multivibrator 60a $\overline{Q}$ output and hence, at the reset input of multivibrator 60b. The presence of a logical "one" level voltage at the set input of RS flip-flop 64 causes the flip-flp to transition, thereby causing a logical "one" level voltage to appear at the output of OR gate 68a. This causes transistor 106a to become conductive.

When transistor 106 becomes conductive, light emitting diode 130a is energized, rendering phototransistor 130b conductive, and, once phototransistor 130b becomes conductive transistor 148 turns off, causing transistors 160, 170, 173 and 177 to become conductive. With transistor 177 conductive, transistor 187 now conducts, drawing as much reverse current from transistor 28a of FIG. 1 as necessary to rapidly render it nonconductive. The presence of a logical "zero" level voltage at the reset input of multivibrator 60b of FIG. 2 prevents the multivibrator from triggering, thereby avoiding erroneous resetting of RS flip-flop 64 of FIG. 2 and premature reconduction of transistor 28a of FIG. 1.

As transistor 28a becomes nonconductive, the induction drive coil current decreases, causing voltage $V_{MX}$ to decrease. Once transistor 28a reaches substantially complete nonconduction, diode 30b of FIG. 1 conducts linear reactor current $I_{Li}$ until a time $t_{la}$, as seen in FIG. 4b, when the diode is reverse biased and thereby rendered nonconductive. When the voltage magnitude at node M with respect to ground decreases below the voltage magnitude across resistance 82 of FIG. 2, then the output voltage of comparator 76 of FIG. 2 changes from a logical "one" level to a logical "zero" level, causing a logical "zero" level voltage to appear at the output of OR gate 68b of FIG. 2, forcing transistor 106b of FIG. 2 into nonconduction. With transistor 106b now nonconductive, base drive circuit 32b of FIG. 1 renders transistor 28b of FIG. 1 conductive in the same manner which base drive circuit 32a of FIG. 3 rendered transistor 28a of FIG. 1 conductive. By preventing transistor 106b from becoming conductive until such time as transistor 106a is nonconductive, simultaneous conduction of transistos 28a and 28b of FIG. 1 is prevented, virtually eliminating possible short circuiting of unidirectional current source 13 of FIG. 1.

When transistor 28b of FIG. 1 becomes conductive, the voltage $V_{MX}$ across the inverter load drops below zero to a constant value of $-V_{DC}/2$. As illustrated in FIG. 4a and 4b with the inverter load voltage now negative, voltage $V_{Cl}$ across capacitance 20 of FIG. 1 and voltage $V_{Li}$ across linear reactor 19 decrease while linear reactor current $I_{Li}$ increases, reaching its peak value at a time t₂ as shown in FIG. 4b. Both voltages $V_{Li}$ and $V_{Cl}$ continue to decrease until the voltage across resistance 45a of FIG. 2, being proportional to voltage $V_{BC}$, is equal to voltage $V_p$ at which time the output voltage of comparator 54 changes from a logical "zero" level to a logical "one" level. When the voltage at the output of comparator 54 changes from a logical "zero" to a logical "one" level, multivibrator 60b triggers.

In the event that the voltage across resistance 45a of FIG. 2 never exceeds voltage $V_p$ at the invert input to comparator 54 of FIG. 2, multivibrator 60b is nevertheless triggered when multivibrator 60d triggers at a predetermined time interval after triggering of multivibrator 60a. In an analogous manner, multivibrator 60a re-triggers when multivibrator 60c triggers at a predetermined time interval after triggering of multivibrator 60b, notwithstanding the logical condition of the output voltage supplied by comparator 50.

The triggering of multivibrator 60b causes a logical "one" level voltage to appear at the reset input of RS flip-flop 64, causing the flip-flop to reset and supply a logical "one" level and a logical "zero" level voltage at the Q and Q flip-flop outputs, respectively. With a logical "one" level voltage at the flip-flop Q output, transistor 106b becomes conductive, supplying voltage to base drive circuit 32b of FIG. 1, which base drive circuit, in response, forces transistor 28b of FIG. 1 substantially into nonconduction. As transistor 28b becomes nonconductive, the voltage between node M and ground increases as illustrated in FIG. 4a until time $t_3$, when this voltage exceeds the voltage at the invert input of comparator 76 of FIG. 2, at which time the output voltage of comparator 76 goes from logical "zero" level to a logical "one" level. As a consequence, the output voltage of OR gate 68a goes to a logical "zero" level, forcing transistor 106a substantially into nonconduction which permits transistor 28a of FIG. 1 to become conductive once again. With transistor 28a conductive, linear reactor voltage $V_{Li}$ and tuning capacitance voltage $V_{Ci}$ increase while linear reactor current $I_{Li}$ decreases as shown in FIG. 4b and reaches its minimum value at time $t_4$. Transistor 28a once again is forced substantially into nonconduction when the linear reactor secondary winding voltage $V_{AB}$ exceeds voltage $V_P$, with transistor 28b then becoming conductive at time $t_5$ when transistor 28a ceases conducting.

The steady state waveforms of inverter load circuit voltage $V_{MX}$ and the tuning capacitance voltage $V_{Ci}$ illustrated in FIG. 4a indicate that voltage $V_{MX}$ appears as a square wave of amplitude $V_{DC}/2$. With tuning capacitance 20 of FIG. 1 selected to tune the inverter load circuit to resonate at a frequency equal to or near the inverter output frequency, inverter load circuit reactive currents are minimized, resulting in an improved inverter load circuit power factor; additionally, tuning capacitance voltage $V_{Ci}$ is nearly sinusoidal, as is induction coil 17 current (not shown), which results in reduced radiation of electromagnetic interference at frequencies greater than the inverter operating frequency because of the absence of harmonics in the induction coil current.

The steady state waveforms of linear reactor voltage $V_{Li}$ and linear reactor current $I_{Li}$ illustrated in FIG. 4b indicate that, unlike tuning capacitance voltage $V_{Ci}$, linear reactor voltage $V_{Li}$ is not nearly as sinusoidal, peaking sharply each time transistors 28a and 28b of FIG. 1 alternate conducting states. Linear reactor current $I_{Li}$ can be seen to lag linear reactor voltage $V_{Li}$ by approximately 90°.

Operation of induction surface unit 10 has been described with the assumption that the output voltage magnitude of power supply 13 of FIG. 1 exceeds a pre-determined minimum value and that the voltage magnitude across induction drive coil 17 of FIG. 1 does not exceed a pre-determined maximum value. Should the output voltage magnitude of power supply 13 not exceed the pre-determined minimum value, then voltage detector circuit 112 of FIG. 2 renders transistors 106c and 106d of FIG. 2 conductive, preventing the conduction of transistors 28a and 28b, respectively, of FIG. 1. Should the voltage magnitude across induction drive coil 17 exceed a pre-determined maximum value, as may occur when metallic utensil 18 of FIG. 1 is displaced from the induction drive coil causing the Q or quality factor of the inverter load circuit to increase significantly, then utensil detector circuit 88 of FIG. 2, responsive to the voltage magnitude across the induction drive coil, periodically renders transistors 106a and 106b of FIG. 2 conductive which, during their conduction intervals, prevents transistors 28a and 28b, respectively, from becoming conductive, thereby reducing the induction drive coil voltage magnitude.

The rate of change of flux density of the magnetic field generated by induction drive coil 17 of FIG. 1, and hence the heat dissipated by utensil 18 of FIG. 1, can be controlled by adjusting potentiometer 52 of FIG. 2 to vary the input voltage to each of comparators 50 and 54 of FIG. 2, thereby controlling the conduction frequency of transistors 28a and 28b of FIG. 1. Typically, the conduction frequency is maintained at approximately 25 kHz. Additionally, the power dissipated by induction drive coil 17 of FIG. 1 can be controlled by rendering control circuit 34 inoperative, and thus rendering transistos 28a and 28b of FIG. 1 nonconductive, during the major portion of time between alternations of the alternating current supplied by alternating current source 14.

FIG. 5 illustrates an improved parallel resonant induction surface unit 300 according to the present invention. Induction surface unit 300 comprises a voltage fed inverter 312 which, when energized by power supply 313, configured identically to power supply source 13 of FIG. 1, supplies a square wave voltage at the inverter output. The square wave inverter output voltage is supplied to an inverter load circuit comprised of a main induction drive coil 317a, an inductor, shown as a second induction drive coil 317b coupled in series with main induction drive coil 317a, and a tuning capacitance 320, which is coupled in parallel with main induction drive coil 317a. Tuning capacitance 320 is typically selected of such a magnitude to tune the inverter load circuit to resonate at a pre-set frequency which is equal to, or near, the inverter output frequency.

Induction drive coils 317a and 317b are each typically configured of a "pancake" type induction drive coil and are positioned with respect to one another as shown in FIG. 6a such that main induction drive coil 317a is disposed substantially within the area bounded by the circumference of second induction drive coil 317b. Thus, as is illustrated in FIG. 6b, when a metallic utensil 318 is separated from induction drive coils 317a and 317b by a spacer, both induction drive coils are beneath the bottom utensil surface.

Inverter 312 shown in FIG. 5 is configured as a half-bridge voltage fed inverter and comprises a pair of serially-connected filter capacitances 324a and 324b which is coupled across power supply 313 and is coupled at the junction between filter capacitances to induction drive coil 317a. Switching means 326a and 326b, each configured identically to switching means 26a and 26b, respectively, of FIG. 1, are coupled in series aiding fashion across the series combination of filter capacitances 324a and 324b, with node M comprising the junction between switching means 326a and 326b, coupled to second induction drive coil 317b. A control circuit 330 is coupled at a first input to node T, comprising the junction between inductive drive coils 317a and 317b, at a second input to node M, and at a third input to power supply 313. In accordance with voltages at the first, second and third control circuit inputs, control circuit 330 renders switching means 326a and 326b alternately conductive at a frequency of approximately 25 KHz.

The details of control circuit 330 are illustrated in FIG. 7. Control circuit 330 includes trigger circuit 340 which supplies, at a Q and a Q output, each of a pair of voltages, respectively, which voltages alternately change from a logical "one" to a logical "zero" level at a frequency of approximately 25 kHz. Trigger circuit 340 comprises four monostable multivibrators 360a, 360b, 360c and 360d, each of which is configured identically to monostable multivibrator 60a of FIG. 2. Each of multivibrators 360a and 360b is coupled at the multivibrator Q output to the multivibrator noninvert set input so as to latch when, with a logical "one" level voltage appearing at the multivibrator noninvert set input, the voltage at the multivibrator invert set input changes from a logical "zero" level to a logical "one" level or when, with a logical "zero" level voltage appearing at the multivibrator invert set input, the voltage at the multivibrator noninvert set input changes from a logical "one" level to a logical "zero" level. The $\overline{Q}$ output of each of multivibrators 360a and 360b is coupled to the reset input of each of multivibrators 360b and 360a, respectively, while the reset input of each of multivibrators 360c and 360d is coupled to a 10 volt DC source. The $\overline{Q}$ output of each of multivibrators 360c and 360d is coupled to the invert set input of each of multivibrators 360c and 360d, respectively, and to each of multivibrators 360a and 360b, respectively.

A double pole, single-throw momentary close switch 361 couples the invert set input and the noninvert set input of multivibrators 360a and 360c, respectively, to the 10 volt DC source. Switch 361 is closed to commence operation of induction surface unit 300 of FIG. 5 by triggering multivibrator 360c and inhibiting multivibrator 360a from triggering.

The Q output of each of multivibrators 360a and 360b is coupled to the noninvert set input of multivibrators 360c and 360d, respectively, and to the set and reset inputs, S and R, respectively, of an R-S flip-flop 364. R-S flip-flop 364 is coupled at its Q and $\overline{Q}$ output, respectively, to the first input of a pair of three input OR gates 368a and 368b, respectively. The second input of each of OR gates 368a and 368b is coupled, respectively, to the first and second input, respectively, of an overlap control circuit 370, which is configured identically to overlap control circuit 70 shown in FIG. 2. The input to overlap control circuit 370 is coupled to node M of FIG. 5. The third input of each of OR gates 368a and 368b is coupled to the output of a utensil detector circuit 388, configured identically to utensil detector circuit 88 of FIG. 2, with the input to utensil detector circuit 388 being coupled to node T of FIG. 5.

OR gates 368a and 368b are each coupled at the output to the base of each of transistors 406a and 406b, respectively. The emitter of each transistor is coupled to circuit ground. Each of transistors 406a and 406b is coupled at the collector to a respective one of switching means 326a and 326b of FIG. 5 and to the collector of a respective one of transistors 406c and 406d. The emitter of each of transistors 406c and 406d is coupled to circuit ground. Transistors 406c and 406d are each supplied at the base with a bias voltage from the 10 volt DC supply through a resistance 408. A capacitance 410 couples the base of each of transistors 406c and 406d to circuit ground.

Voltage detector circuit 412, configured identically to voltage detector circuit 112 of FIG. 2, is coupled at its input to power supply 313. In accordance with the power supply output voltage magnitude, voltage detector circuit 412 provides an output voltage, which changes from a first to a second level, to the base of each of transistors 406c and 406d to render them conductive, thereby preventing low voltage levels from erroneously causing conduction of either or both of switching means 326a and 326b of FIG. 5.

Induction surface unit 300 operation will now be set forth with the assumption that no initial voltage is present across induction drive coil 317a and that the power supply output voltage magnitude exceeds a minimum allowable value. When switch 361 is momentarily closed, a 10 volt DC potential appears at the invert set input and the noninvert set input of each of multivibrators 360a and 360c, respectively. Multivibrator 360a is thus inhibited from triggering and multivibrator 360c triggers.

Before multivibrator 360c triggers, a logical "zero" level voltage is present at the output of OR gate 368a and a logical "one" level voltage is present at the output of OR gate 368b. With the output voltage of utensil detector circuit 388 at a logical "zero" level, transistors 406c and 406d remain nonconductive. With both of transistors 406c and 406d nonconductive, and transistors 406a and 406b nonconductive and conductive, respectively, switching means 326a of FIG. 5 is rendered conductive and switching means 326b thereof remains nonconductive.

Triggering of multivibrator 360c causes trggering of multivibrator 360a, in turn causing flip-flop 364 to transition. As a result, the voltages appearing at the output of each of OR gates 368a and 368b reverse from a logical "zero" to a logical "one" level and from a logical "one" level to a logical "zero" level, respectively. Accordingly, transistors 406a and 406b both become conductive, causing switching means 326a of FIG. 5 to become nonconductive and switching means 326b to remain nonconductive. When the voltage between node M of FIG. 5 and circuit ground drops below a predetermined value, the voltages provided at the first and second outputs, respectively, of overlap detector circuit 370 change from a logical "zero" level to a logical "one" level and from a logical "one" level to a logical "zero" level, respectively, causing a logical "zero" level voltage to appear at the output of OR gate 368b, which forces transistor 406b into nonconduction and thereby allows switching means 326b to become conductive.

Upon termination of a predetermined time interval after multivibrator 360a triggers, multivibrator 360d triggers, causing multivibrator 360a to return to its stable state and causing multivibrator 360b to trigger. When multivibrator 360b triggers, flip-flop 364 again transitions, causing both of transistors 406a and 406b to become conductive, thereby forcing switching means 326b of FIG. 5 to become non-conductive. The voltage between node M of FIG. 5 and circuit ground now increases until it exceeds the preset value, at which time overlap control circuit 370 forces transistor 406a into nonconduction, thereby allowing switching means 326a of FIG. 5 to become conductive once again.

The alternate conduction of switching means 326a and 326b continues in the manner described for so long as the output voltage magnitude of power supply 313 exceeds a minimum allowable value and for so long as the voltage magnitude across induction drive coil 317a remains below a maximum allowable value as will be the case while metallic, food-containing utensil 318 of FIG. 6b continues to be positioned adjacent to induction drive coils 317a and 317b during induction surface unit operation.

With tuning capacitance 320 selected of a magnitude such that the inverter load circuit resonates at a frequency equal to, or near the inverter output frequency, reactive inverter load circuit currents are minimized, which results in an improved inverter load circuit power factor. Reducing inverter load circuit reactive currents greatly reduces the reactive currents carried by each of switching means 326a and 326b and greatly reduces inverter switching means stress since each of switching means 326a and 326b now carries substantially real current. As a consequence of the inverter load circuit being tuned to resonate at or near the inverter output frequency, main induction drive coil 317a voltage and current are nearly sinusoidal, resulting in reduced radiation of electromagnetic interference at frequencies higher than the inverter output frequency. Induction drive coil 317b current, although not as sinusoidal as main induction drive coil 317a current, contains few harmonics because of the filtering effect of tuning capacitance 320 and the inductance of induction drive 317b.

Induction surface unit 300 of FIG. 5 offers improved performance in comparison with induction surface unit 10 of FIG. 1. The absence of a linear reactor within induction surface unit 300 reduces fabrication costs because each of induction drive coils 317a and 317b can be constructed of smaller diameter wire in comparison to the wire size required for induction drive coil 17 of FIG. 1.

In FIG. 8, an induction surface unit 500 comprises an inverter 512 which, when supplied with current from a power supply 513, configured identically to power supply 13 of FIG. 1, provides a square wave output voltage to a load circuit comprised of a main induction drive coil 517a, a second induction drive coil 517b coupled in series with induction drive coil 517a, and a tuning capacitance 520 coupled in parallel with induction drive coil 517a and selected to tune the inverter load circuit to resonate at a preset frequency, which is typically equal to, or near the inverter output frequency. Induction drive coils 517a and 517b are each "pancake" type coils and are positioned with respect to one another in the same manner as described for induction drive coils 317a and 317b of FIGS. 6a and 6b, so that when a metallic utensil 518 is positioned adjacent to induction drive coils 517a and 517b, both induction drive coils are situated beneath the bottom utensil surface.

Inverter 512 is configured as a full bridge inverter and comprises a filter capacitance 524 coupled across power supply 513. A first pair of serially coupled switching means 526a and 526b is coupled across capacitance 524 with a node $M_1$ at the junction between the first pair of switching means, coupled to induction drive coil 517a. A second pair of serially coupled switching means 526c and 526d is coupled across capacitance 524, with a node $M_2$ at the junction between the second pair of switching means, coupled to induction drive coil 517b.

Figure 9:
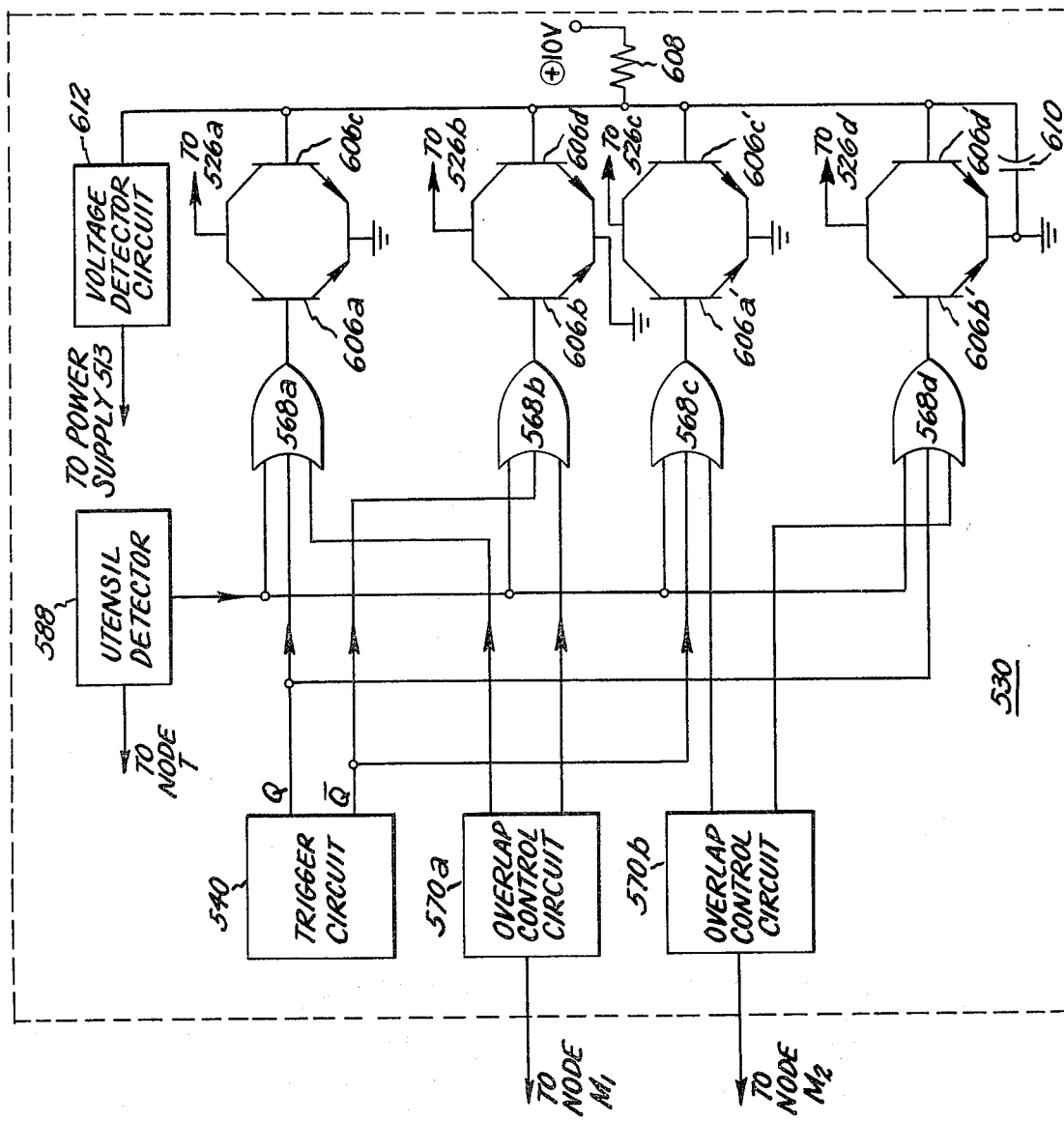
FIG. 9 is a block diagram of the control circuit of the induction surface unit of FIG. 8.

A control circuit 530, described in greater detail in conjunction with FIG. 9, is coupled at its first, second, third and fourth inputs to power supply 513, node $M_1$, node $M_2$ and a node T at the junction between induction drive coils 517a and 517b, respectively. In accordance with the voltage at each of its inputs, control circuit 530 simultaneously renders switching means pairs 526a and 526d conductive and simultaneously renders switching means pairs 526b and 526c conductive at alternate intervals at a frequency of approximately 25 kHz.

Referring now to FIG. 9, control circuit 530 includes a trigger circuit 540 configured identically to trigger circuit 340 of FIG. 7. Trigger circuit 540 produces an output voltage at each of the Q and $\overline{Q}$ outputs, which voltages alternately change from a logical "one" level to a logical "zero" level at a frequency of approximately 25 kHz. The voltage provided at the trigger circuit $\overline{Q}$ output is supplied to the first input of each of a pair of 3 input OR gates 568a and 568d, while the voltage provided at the trigger circuit Q output is supplied to the first input of each of a second pair of three input OR gates 568b and 568c. Each of OR gates 568a and 568b is coupled at its input to the first and second outputs, respectively, of a first overlap detector circuit 570a, configured identically to overlap detector circuit 70 of FIG. 2. The input to overlap detector circuit 570a is coupled to node $M_1$ of FIG. 8. Each of OR gates 568c and 568d is coupled at its second input to the first and second outputs, respectively, of a second overlap detector circuit 570b which is coupled at its input to node $M_2$ of FIG. 8. The third input to each of OR gates 568a–568d is supplied with the output voltage of a utensil detector circuit 588, configured identically to utensil detector circuit 88 of FIG. 1. Utensil detector circuit 588 is coupled at its input to node T of FIG. 8.

Each of OR gates 568a–568d is coupled at its output to the base of each of transistors 606a, 606b, 606a' and 606b', respectively, which transistors are each coupled at the collector to an associated one of switching means 526a–526d, respectively, of FIG. 8. Coupled across the collector-emitter portion of each of transistors 606a, 606b, 606a' and 606b' is the collector-emitter portion of one of transistors 606c, 606d, 606c' and 606d', respectively. Each of transistors 606c, 606d and 606c' and 606d', respectively, is coupled at the emitter to circuit ground and at the collector to a 10 volt direct current supply by a resistance 608. A capacitor 610 couples the base of each of transistors 606c, 606d, 606c' and 606d' to circuit ground.

A voltage detector circuit 612, configured identically to voltage detector circuit 112 of FIG. 2, is coupled at its input to power supply 513 of FIG. 8. Should the output voltage magnitude of power supply 513 drop below a preset value, then voltage detector circuit 612 supplies a base-emitter voltage to each of transistors 606c, 606d, 606c' and 606d' to render them conductive and thereby prevent each of switching means 526a 526b, 526c and 526d, respectively, of FIG. 8 from becoming conductive.

Operation of induction surface unit 500 of FIG. 8 will now be set forth assuming that both the main induction drive coil voltage magnitude, and the power supply output voltage magnitude are within allowable limits so that utensil detector circuit 588 and voltage detector circuit 612 of FIG. 9 each provide a logical "zero" level output voltage. Under these conditions, the output voltage provided by each of OR gates 568a and 568d alternates between a logical "zero" and a logical "one" level in accordance with the trigger circuit $\overline{Q}$ output voltage and the conductivity of switching means 526b and 526c of FIG. 8. In like manner, the output voltage provided by each of OR gates 568b and 568c alternates between a logical "one" and a logical "zero" level in accordance with the trigger circuit Q output voltage and the conductivity of switching means 526a and 526d. As a consequence, transistors 606b and 606a' are simultaneously rendered conductive and transistors 606a and 606b' are simultaneously rendered conductive at alternate intervals, thus rendering switching means 526a and 526d simultaneously conductive and switching means 526b and 526c simultaneously conductive at alternate intervals.

When supplied with alternating current, induction drive coils 517a and 517b generate a time variant magnetic field which circulates eddy currents in the surface of utensil 518, thereby causing joule losses and utensil heating. By selecting capacitor 520 of such magnitude as to tune the inverter load circuit, comprised of induction drive coils 517a, 517b and tuning capacitor 520, to resonate at a frequency at, or near the inverter output frequency reactive inverter load circuit currents are minimized resulting in improved inverter load circuit power factor and reduced stresses on switching means 526a-526d. Also, with tuning capacitor 520 so selected, induction drive coil 517a current and voltage are nearly sinusoidal, reducing electromagnetic interference radiated by induction drive coil 517a at frequencies greater than the inverter output frequency.

Should the main induction drive coil voltage magnitude exceed an allowable value, utensil detector circuit 588 becomes opertive to render each of transistors 606a, 606b, 606a' and 606b' conductive to prevent switching means 526a, 526b, 526c and 526d, respectively, from becoming conductive.

FIG. 10 shows yet another embodiment 700 of a parallel resonant induction surface unit according to the present invention which comprises a voltage fed inverter 712. Inverter 712, when energized from a power supply 713, configured identically to power supply 13 of FIG. 1, produces a square wave output voltage. The inverter output voltage is supplied to a load circuit comprised of a main, closely coupled, dual winding, induction drive coil 717a whose windings 717aa 717aaa are coupled in series with windings 717bb and 717bbb, respectively, of a second, closely coupled, dual winding induction drive coil 717b between each of the inverter outputs. Each of induction drive coils 717a and 717b is typically a "pancake" type coil positioned with respect to one another in the same manner as induction drive coils 317a and 317b described with respect to FIGS. 6a and 6b. Thus, when a metallic utensil 718 is positioned adjacent to induction drive coils 717a and 717b, both induction drive coils are beneth the utensil bottom surface. Coupled in parallel with the serial combination of induction drive coil windings 717aa and 717aaa is a tuning capacitance 720 which is selected to tune the inverter load circuit, comprised of induction drive coils 717a and 717b and the tuning capacitance, to resonate at a preset frequency, typically equal to, or near the inverter frequency.

Figure 11:
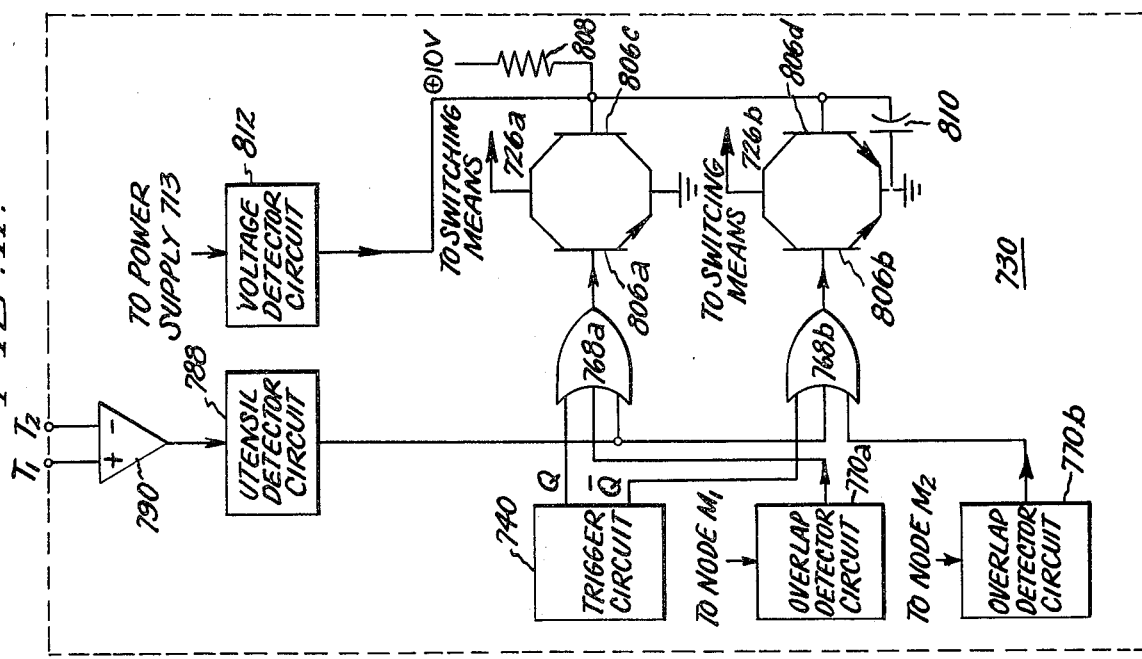
FIG. 11 is a block diagram of the control circuit of the induction cooking surface unit of FIG. 10.

Voltage fed inverter 712 is configured as a push-pull inverter and comprises a filter capacitor 724 coupled across power supply 713. Each of a pair of switching means 726a and 726b, configured identically to switching means 26a and 26b, respectively, of FIG. 1 is coupled between one of induction drive coil windings 717bb and 717bbb, respectively, and power supply 713. A control circuit 730, the details of which are described with respect to FIG. 11, is coupled at the first and second inputs to nodes $T_1$ and $T_2$ which comprise the first and second terminals, respectively, of capacitance 720. Control 730 is coupled at the third input to node $M_1$, comprising the junction of winding 717bb and switching means 726a, and is coupled at the fourth input to node $M_2$, comprising the junction of winding 717bbb and switching means 726b. The fifth input of control circuit 730 is coupled to power supply 713. In accordance with voltages received at each of its inputs, control circuit 730 supplies one of a pair of control voltages, respectively, to one of switching means 726a and 726b, respectively, at a rate which alternately renders them conductive at a frequency of approximately 25 kHz. This causes alternating voltages to appear across the first inverter output (between node $M_1$ and power supply 713) and across the second inverter output (between node $M_2$ and power supply 713).

As shown in block diagram form in FIG. 11, control circuit 730 comprises a trigger circuit 740, configured identically to trigger circuit 340 of FIG. 7, which provides an output voltage at each of the trigger circuit Q and $\overline{Q}$ outputs, the pair of output voltages alternately changing between logical "one" and logical "zero" levels. The Q and $\overline{Q}$ outputs of trigger circuit 740 are each coupled to the first input of each of a pair of three input OR gates 768a and 768b, respectively. Each of a pair of overlap detector circuits 770a and 770b is configured identically to overlap detector circuit 70 of FIG. 2 and is coupled at its input to one of nodes $M_1$ and $M_2$, respectively, of FIG. 10. Each of detector circuits 770a and 770b, respectively, provides an output voltage to the second input of each of OR gates 768a and 768b, respectively, in accordance with the conductivity of switching means 726a and 726b, respectively, of FIG. 10.

A utensil detector circuit 788, configured identically to utensil detector circuit 88 of FIG. 2, is coupled at its input to the output of a comparator 790, the invert and noninvert inputs to which are coupled to nodes $T_1$ and $T_2$, respectively, of FIG. 9. Utensil detector circuit 788 provides an output voltage which changes from a logical "zero" to a logical "one" level, in accordance with the voltage magnitude across induction drive coil 717a of FIG. 10, to the third input of each OR gate 768a and 768b.

Each of OR gates 768a and 768b, respectively, is coupled at its output to the base of transistors 806a and 806b, respectively. The collector of each of transistors 806a and 806b is coupled to a respective one of switching means 726a and 726b of FIG. 10. The emitter of each of transistors 806a and 806b is coupled to circuit ground. Coupled in parallel across the collector-emitter portion of each of transistors 806a and 806b, respectively, is the collector-emitter portion of transistors 806c and 806d, respectively. Each of transistors 806c and 806d is supplied at the base with a 10 volt DC bias through a resistance 808. A capacitance 810 couples the base of each of transistors 806c and 806d to circuit ground.

Transistors 806c and 806d are each supplied at the base with the output voltage of a voltage detector circuit 812 configured identically to voltage detector circuit 112 of FIG. 2, voltage detector circuit 812 being coupled at its input to power supply 713 of FIG. 10. Should the output voltage magnitude of power supply 713 decrease below a preset minimum value, voltage detector circuit 812 renders both of transistors 806c and 806d conductive, preventing switching means 726a and 726b, respectively, of FIG. 10 from becoming conductive during such intervals of low voltage.

During operation of induction surface unit 700 of FIG. 10, assuming that the output voltage of power supply 713 exceeds the preset minimum value and that the voltage magnitude across induction drive coil 717a does not exceed a preset maximum value, the output voltage of each of utensil detector circuit 788 and voltage detector circuit 812, both of FIG. 11, remains at a logical "zero" level. With the output voltage of voltage detector circuit 812 and utensil detector circuit 788 at a logical "zero" level, the output voltage of OR gates 768a and 768b of FIG. 11 alternate between a logical "zero" and a logical "one" level at a frequency of approximately 25 kHz, the trigger circuit output frequency. Consequently, transistors 806a and 806b of FIG. 11 are alternately rendered conductive at that frequency, resulting in the periodic conduction of switching means 726b and 726a respectively, of FIG. 10, thereby causing an alternating voltage to be supplied to induction drive coils 717a and 717b of FIG. 10. When supplied with alternating voltage, induction drive coils 717a and 717b generate a time-variant magnetic field for circulating eddy currents in the surface of metallic utensil 718 of FIG. 10, causing joule losses in the utensil surface and hence utensil heating.

Should the voltage magnitude across induction drive coil 717a exceed a preset maximum allowable value, then the utensil detector circuit becomes operative to render transistors 806c and 806d conductive to prevent the conduction of switching means 726b and 726a respectively, of FIG. 10. Should the output voltage magnitude of power supply 713 of FIG. 10 decrease below a preset minimum allowable value, then voltage detector circuit 812 becomes operative to render transistors 806c and 806d conductive to prevent the conduction of switching means 726a and 726b, respectively.

With capacitance 720 selected to tune the inverter load circuit to resonate at a frequency at, or near, the inverter output frequency, inverter load circuit reactive currents are minimized resulting in improved inverter load circuit power factor and reduced stresses on inverter switching components. Also, with capacitance 720 so selected, induction drive coil 717a current and voltage are nearly sinusoidal, thereby reducing radiation of electromagnetic interference at frequencies greater than the inverter output frequency.

The foregoing describes a parallel resonant induction surface unit comprised of a voltage fed inverter which supplies an inverter load circuit, comprised of a main induction drive coil, an inductor serially coupled with the main induction drive coil, and a tuning capacitance coupled in parallel with the main induction drive coil and selected to tune the inverter load circuit to resonate at, or near, the inverter output frequency, with a square wave voltage. Tuning the inverter load circuit to resonate as close as possible to the inverter output frequency minimizes inverter load circuit reactive currents, thereby improving inverter load circuit power factor and reducing inverter switching component stresses and radiated electromagnetic interference at frequencies greater than the inverter operating frequency.

It should be noted that while the switching means of each of the parallel resonant induction surface embodiments described above has ben specified as a transistor, field effect transistors or gate turn-off thyristors could also be used without degradation of induction surface unit performance.

While the invention has been particularly shown and described with reference to several preferred embodiments thereof, it will be understood by those skilled in the art that various changes in form and detail may be made therein without departing from the true spirit and scope of the invention as defined by the appended claims.

What is claimed is:

1. A parallel resonant induction surface unit forinductively heating a substantially metallic cooking utensil positioned in proximity thereto, comprising:

a transistorized inverter with switching devices having gate turn-off capability, said inverter having an input coupled to an external power supply for supplying a square wave voltage at an output;

a main induction drive coil for inductively heating said substantially metallic cooking utensil;

a tuning capacitor in parallel with said main induction drive coil;

a second induction drive coil for inductively heating said substantially metallic cooking utensil coupled in series with the parallel combination of said main induction drive coil and said tuning capacitor, said second induction drive coil coupled in series with the parallel combination of said main induction drive coil and said tuning capacitor all being connected across the output of said inverter, said main induction drive coil, said tuning capacitor and said second induction drive coil being selected to have a magnitude so as to form a tuned circuit thereby minimizing inverter reactive currents and minimizing inverter component electrical stresses.

2. The invention according to claim 1 wherein said main induction drive coil and said second induction drive coil are positioned concentrically relative to one another.

3. The invention according to claim 1 wherein each of said main and said second induction drive is positioned in proximity with the substantially metallic cooking utensil.

4. The invention according to claim 1 wherein said inverter comprises:

a pair of filter capacitances serially coupled across said power supply output and coupled at the junction between said capacitances to said main induction drive coil;

a pair of switching means serially coupled across said pair of filter capacitances and coupled at the junction between said switching means to said second induction drive coil; and control means having a first, second and third inputs, said first input coupled to the junction between said pair of switching means, said second input coupled to the junction between said main induction drive coil and said second induction drive coil, and said third input coupled to said power supply, said control means alternately rendering the switching means of said pair of switching means conductive in accordance with voltages supplied to said first, second, and third control means inputs.

5. The invention according to claim 4 wherein said control means comprises:

trigger circuit means for producing first and second voltages which periodically change from a first to a second level at alternate intervals;

first circuit means coupled to said main induction drive coil for producing an output voltage which changes from a first to a second level in accordance with main induction drive coil voltage;

second circuit means coupled to the junction between said pair of switching means for producing a first voltage which changes from a first to a second level in accordance with the conductivity of one of said pair of switching means and a second voltage which changes from a first to a second level in accordance with the conductivity of the other of said pair of switching means;

logic circuit means coupled to said trigger circuit means and to said first and second circuit means, said logic circuit means producing first and second output voltages which periodically change from a first to a second level at alternate intervals in accordance with a predetermined relationship among voltages produced by said trigger circuit means, said first and said second circuit means;

detector circuit means coupled to said power supply for producing an output voltage which changes from a first to a second level when the output voltage produced by said power supply decreases below a preset limit; and a switching means operating circuit coupled to said logic circuit means and to said detector circuit means; said switching means operating circuit being coupled to each of said switching means and alternately rendering said switching means conductive during intervals when the voltage produced by said power supply is above said preset limit in accordance with said first and second voltages produced by said logic circuit means.

6. The invention according to claim 4 wherein each of said pair of switching means comprises:

a transistor having a base, collector, and emitter, the collector-to-emitter portion being coupled between said power supply and said inductor;

a diode coupled in parallel opposition to the collector-to-emitter portion of said transistor; and a base drive circuit having an output coupled to the base and emitter of said transistor and having an input coupled to said control means, said base drive circuit being rendered operative by said control means to periodically render the collector-to-emitter portion of said transistor conductive.

7. The invention according to claim 1 wherein said inverter comprises:

a filter capacitance coupled across the output of said power supply;

first and second switching means serially coupled across said filter capacitance and coupled at the junction between said first and second switching means to said main induction drive coil;

third and fourth switching means serially coupled across said filter capacitance and coupled at the junction between said third and fourth switching means to said second induction drive coil; and control means having a first, second, third and fourth inputs, said first input being coupled to the junction between said first and second switching means, said second input being coupled to the junction between said third and said fourth switching means, said third input being coupled to the junction between said main induction drive coil and said second induction drive coil, said fourth input coupled to said power supply, said control means simultaneously rendering said first and third switching means periodically conductive and simultaneously rendering said second and said fourth switching means periodically conductive at alternate intervals in accordance with voltages supplied to each of said first, said second, said third and said fourth control means inputs to supply said main induction drive coil with alternating current.

8. The invention according to claim 7 wherein said control means comprises:

trigger circuit means producing first and second voltages which periodically change from a first to a second level at alternate intervals;

first circuit means coupled to said main induction drive coil for producing an output voltage which changes from a first to a second level in accordance with the voltage across said main induction drive coil;

second circuit means coupled to the junction between said first and said second switching means for producing a first voltage which changes from a first to a second level in accordance with the conductivity of said first switching means and producing a second voltage which changes from a first to a second level in accordance with the conductivity of said second switching means;

third circuit means coupled to the junction between said third and said fourth switching means for producing a first voltage which changes from a first to a second level in accordance with the conductivity of said third switching means and producing a second voltage which changes from a first to a second level in accordance with the conductivity of said fourth switching means;

first logic circuit means coupled to said first and said second circuit means, said first logic means coupled to said trigger circuit means and producing first and second voltages which periodically change from a first to a second level at alternate intervals in accordance with a predetermined logical relationship among voltages produced by said trigger circuit means and said first and said second circuit means;

second logic circuit means coupled to said first and said third circuit means said second logic circuit means coupled to said trigger circuit means and producing first and second voltages which periodically change from a first to a second level at alternate intervals in accordance with a predetermined relationship among voltages produced by said first, and said third circuit means and said trigger circuit means;

detector circuit means coupled to said power supply and producing a voltage which changes from a first to a second level when the voltage supplied by said power supply decreases below a present level;

a first switching means operating circuit coupled to said first logic circuit means and to said detector circuit means, said first switching means operating circuit being coupled to said first and said second switching means for periodically rendering said first and said second switching means conductive at alternate intervals when the voltage produced by said power supply exceeds said present limit in accordance with voltages supplied by said first logic circuit means;

a second switching means operating circuit coupled to said second logic circuit means and said detector circuit means, said second switching means operating circuit coupled to said third and said fourth switching means and periodically rendering said third and said fourth switching means conductive at alternate intervals when the voltage produced by said power supply exceeds a preset limit in accordance with voltages produced by said second logic circuit means.

9. The invention according to claim 7 wherein each of said first, second, third and fourth switching means comprises:

a transistor having a base, collector, and emitter, the collector-to-emitter portion of said transistor coupled between said power supply and said inductor;

a diode coupled in parallel opposition with the collector-to-emitter portion of said transistor; and a base drive circuit having an output coupled to the base and emitter of said transistor and having an input coupled to said control means, said base drive circuit being rendered operative by said control means to periodically render said transistor conductive.

10. The invention according to claim 1 wherein said inverter includes a first and second output, said main induction drive coil includes first and second closely coupled windings connected in series and the junction between said windings coupled to said power supply and wherein said second induction drive coil comprises a first and second closely coupled windings, said first winding of said second induction drive coil and said first winding of said main induction drive coil coupled across said first inverter output and said second winding of said second induction drive and said second winding of said main induction drive coil coupled across said second inverter output.

11. The invention according to claim 10 wherein said inverter comprises:

first switching means coupled between said power supply and the serial combination of said first winding of said main induction drive coil and said first winding of said second induction drive coil;

second switching means coupled between said power supply and the serial combination of said second winding of said main induction drive coil and said second winding of said second induction drive coil; and control means coupled having a first and second input coupled to each of the two terminals, respectively, of said tuning capacitance, a third input coupled to said first switching means, a fourth input coupled to said second switching means and a fifth input coupled to said power supply, said control means alternately rendering said first and second switching means conductive in accordance with voltages supplied to said control means inputs.

12. The invention according to claim 11 further including a filter capacitance coupled across said power supply.

13. The invention according to claim 11 wherein each of said first and second switching means comprises:

a transistor having a base, collector, and emitter, the collector-to-emitter portion being coupled between said power supply and one of the windings of said main and said second induction drive coil;

a diode coupled in parallel opposition with the collector-to-emitter portion of said transistor; and a base drive circuit coupled at the output to said base and said emitter of said transistor and coupled at the input to said control means, said base drive circuit being rendered operative by said control means to periodically render said transistor conductive.

14. The invention according to claim 11 wherein said control means comprises:

trigger circuit means for producing first and second voltages which periodically change from a first to a second level at alternate intervals;

first circuit means coupled to the terminals of said tuning capacitance for producing an output voltage which changes from a first to a second level in accordance with the voltage across said main induction drive coil;

second circuit means coupled to the junction between said first winding of said second induction drive coil and said first switching means for producing an output voltage which changes from a first to a second level in accordance with the conductivity of said first switching means;

third circuit means coupled to the junction between said second winding of said second induction drive coil and said second switching means for producing an output voltage which changes from a first to a second level in accordance with the conductivity of said second switching means;

logic circuit means coupled to said trigger circuit means and to said first and second and third circuit means for producing first and second voltages which periodically change from a first to a second level at alternate intervals in accordance with voltages produced by said trigger circuit means and said first and second circuit means;

detector circuit means coupled to said power supply for producing an output voltage which changes from a first to a second level when the voltage produced by said power supply decreases below a preset level; and a switching means operating circuit coupled to said logic circuit means and said detector circuit means, said switching means operating circuit coupled to said first and second switching means and rendering said first and second switching means periodically conductive at alternate intervals when the voltage produced by said power supply exceeds said preset limit in accordance with voltages produced by said logic circuit.

15. A parallel resonant induction heating unit for inductively heating a substantially metallic object positioned in proximity therewith comprising:

a pair of filter capacitances serially coupled across an external power supply;

a pair of switching means serially coupled across said pair of filter capacitances; a main induction drive coil for inductively heating said substantially metallic object;

a second induction drive coil for inductively heating said substantially metallic object coupled in series with said main induction drive coil between the junction of said pair of filter capacitances and the junction of said pair of switching means;

control means having a first input coupled to the junction between said switching means, a second input coupled to said power supply and a third input coupled to the junction between said main induction drive coil and said second induction drive coil, said control means coupled to said switching means for periodically rendering said switching means conductive at alternate intervals in accordance with voltages supplied to said first, second and third control means inputs; and a tuning capacitance coupled in parallel with said main induction drive coil, said tuning capacitance being selected of such a magnitude to form a tuned circuit in combination with said main induction drive coil and said second induction drive coil so that reactive currents are minimized, thereby maximizing tuned circuit power factor and minimizing switching means electrical stresses.

16. The invention according to claim 15 wherein said inductor comprises a second induction drive coil serially coupled with said main induction drive coil between the junction of said filter capacitances and the junction between said switching means.

17. The invention according to claim 16 wherein each of said main and said second induction drive coils is positioned in proximity with the metallic object.

18. A parallel resonant induction heating unit for inductively heating a substantially metallic object positioned in proximity therewith comprising:
   a filter capacitance coupled across an external power supply;
   a first pair of switching means serially coupled across said filter capacitance;
   a second pair of switching means serially coupled across said filter capacitance;
   a main induction drive coil for inductively heating said substantially metallic object;
   a second induction drive coil for inductively heating said substantially metallic object coupled in series with said main induction drive coil between the junction of said first pair of switching means and the junction of said second pair of switching means;
   a control circuit having a first input coupled to the junction between said first pair of switching means, a second input coupled to the junction between said second pair of switching means, a third input coupled to said power supply and a fourth input coupled to the junction of said main induction drive coil and said second induction drive coil, said control means rendering a selected one of the switching means of said first pair conductive and a selected one of the switching means of said second pair of switching means conductive in unison in accordance with voltages supplied to said control means inputs, to supply said main induction drive coil with alternating current; and
   a tuning capacitance coupled in parallel with said main induction drive coil, said tuning capacitance being selected of such a magnitude so as to form a tuned circuit in combination with said second induction drive coil and said main induction coil so that inverter reactive currents are minimized, thereby maximizing tuned circuit power factor and minimizing switching means electrical stresses.

19. The invention according to claim 18 wherein each of said main and said second induction drive coils is positioned in proximity with the substantially metallic object.

20. A parallel resonant induction surface unit for inductively heating a substantially metallic object comprising:
   a power supply;
   a filter capacitance coupled across said power supply;
   a main induction drive coil having first and second closely coupled, serially connected windings coupled at the junction between said windings to first terminal of said power supply;
   a second induction drive coil having first and second closely coupled windings, said first winding of said second induction drive coil connected to said first winding of said main induction drive coil and said second winding of said second induction drive coil connected to said second winding of said main induction drive coil;
   a first switching means coupled between said first winding of said second induction drive coil and second terminal of said power supply;
   a second switching means coupled between said second winding of said second induction drive coil and second terminal of said power supply;
   control means coupled at a first input to the junction between said first winding of said induction drive coil and said first winding of second induction drive coil, at a second input to the junction of said second winding of said main induction drive coil and said second winding of said second induction drive coil, a third input coupled to said first switching means, a fourth input coupled to said power supply and at a fifth input to said second switching means, said control means periodically rendering said first and said second switching means conductive at alternate intervals in accordance with the voltages at said first, second, third, fourth and fifth control means inputs; and
   a tuning capacitance coupled across said main induction drive coil; said tuning capacitance being selected of such a magnitude to form a tuned circuit in combination with said main induction drive coil and said second induction drive coil so that tuned circuit reactive currents are minimized, thereby maximizing tuned circuit power factor and minimizing switching means electrical stresses.

* * * * *